S. D. SMITH.
AUTOMATIC AUTOMOBILE JACK.
APPLICATION FILED APR. 23, 1914.
1,140,624.
Patented May 25, 1915.
2 SHEETS—SHEET 2.
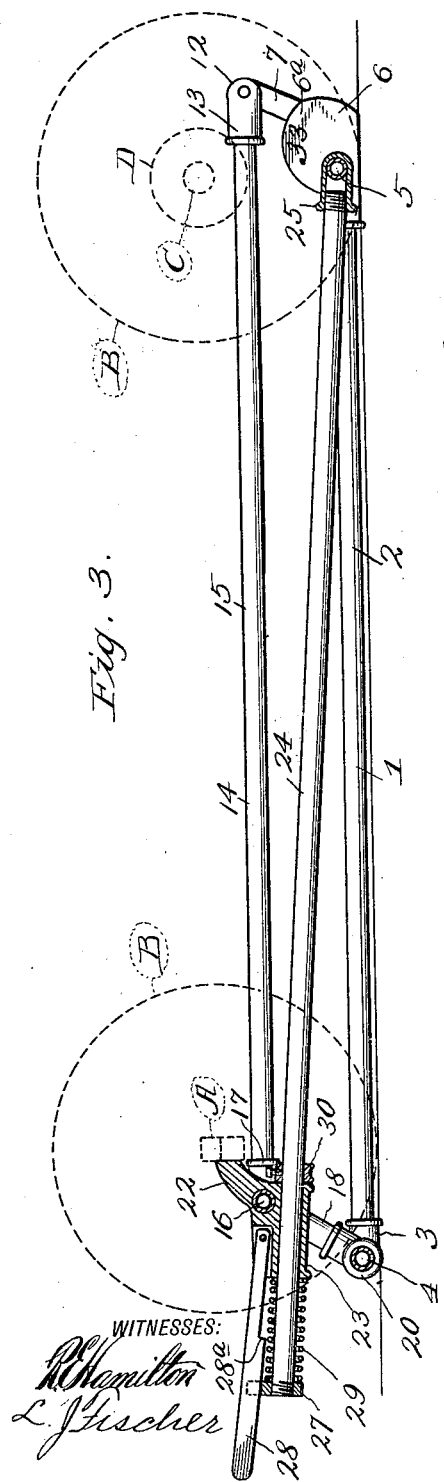
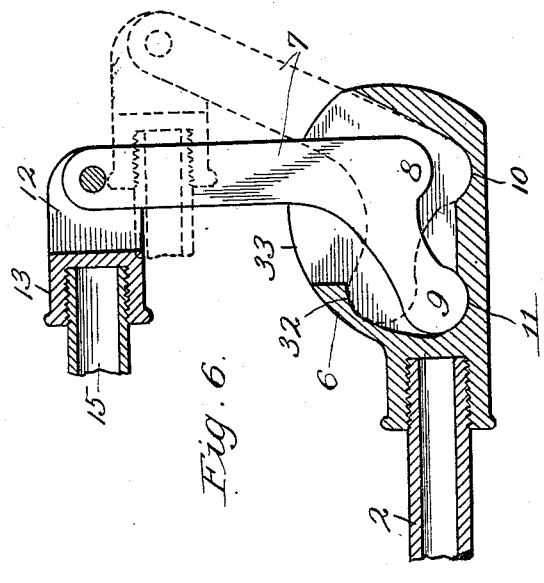
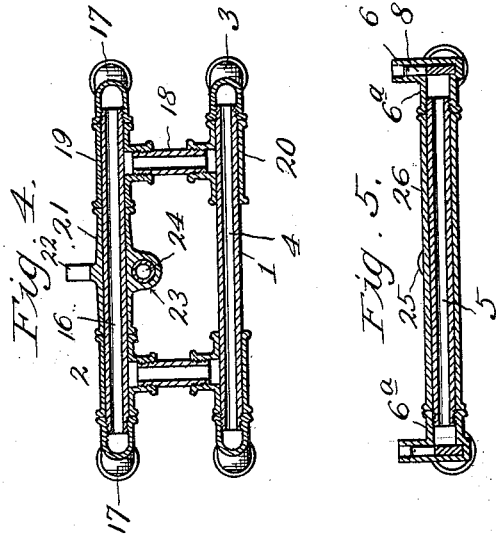
INVENTOR:
Stuart D. Smith,
BY
F. G. Fischer,
ATTORNEY.
WITNESSES:
R. Hamilton
L. Fischer

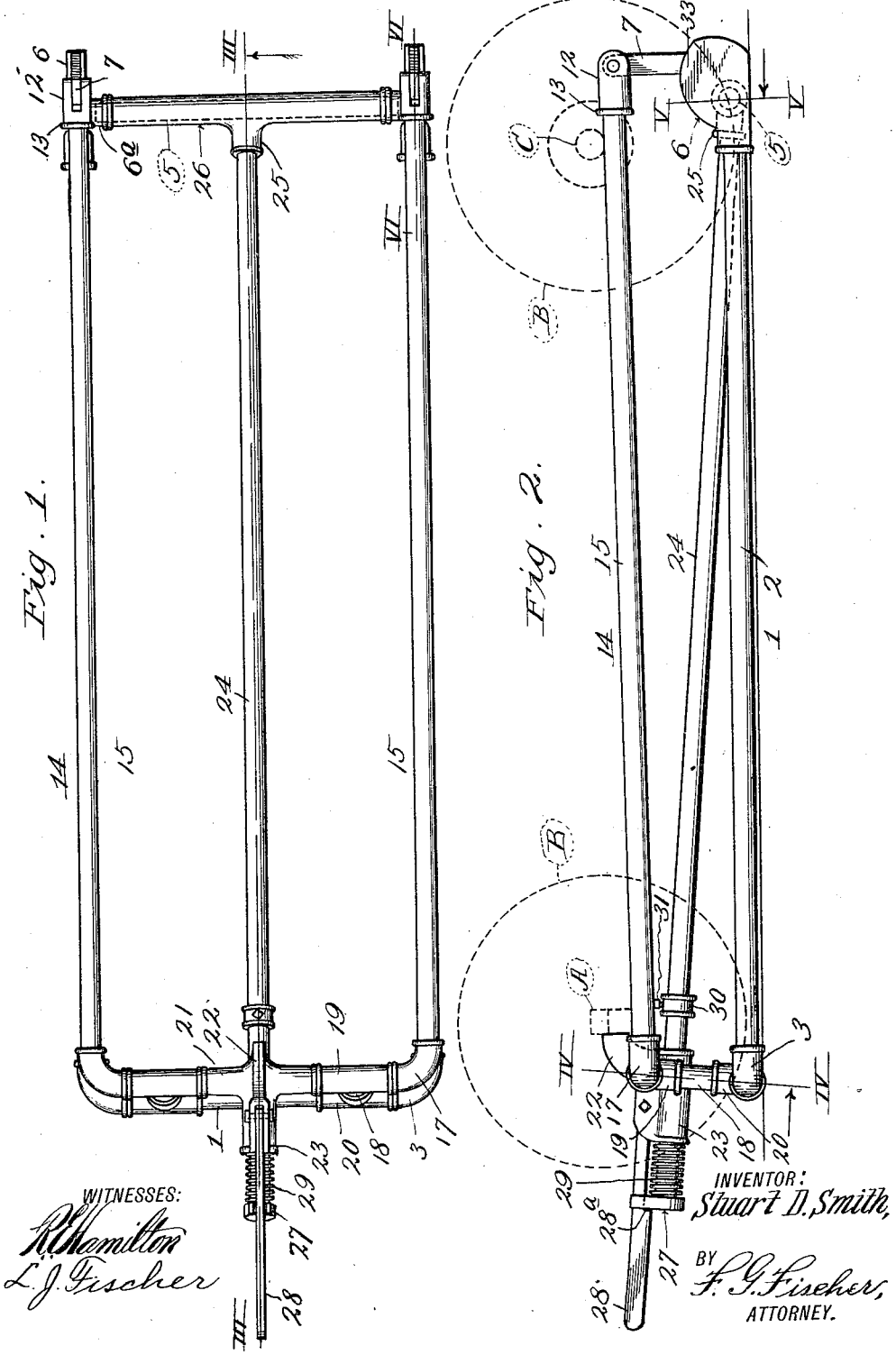

UNITED STATES PATENT OFFICE.

STUART D. SMITH, OF KANSAS CITY, MISSOURI, ASSIGNOR, BY DIRECT AND MESNE ASSIGNMENTS, OF TWO-THIRDS TO CHARLES W. BECHTEL, OF KANSAS CITY, MISSOURI.

AUTOMATIC AUTOMOBILE-JACK.

1,140,624.  Specification of Letters Patent.  Patented May 25, 1915.

Application filed April 23, 1914. Serial No. 833,899.

*To all whom it may concern:*

Be it known that I, STUART D. SMITH, a citizen of the United States, residing at Kansas City, in the county of Jackson and State of Missouri, have invented certain new and useful Improvements in Automatic Automobile-Jacks, of which the following is a specification.

My invention relates to improvements in means for lifting vehicles, such as automobiles and the like, and it consists of an automatic jack actuated to lift an automobile when the same impinges against a bumper constituting a part of the invention.

The invention is particularly adapted for use in garages where it is desirable to lift automobiles to relieve their tires of all weight, to the end that the life of said tires may be prolonged.

The invention is simple in construction and operation, and economical in cost of construction, and in order that the invention may be fully understood, reference will now be made to the accompanying drawings, in which:

Figure 1 is a plan view of the jack. Fig. 2 is a side elevation of the jack in raised position, with the wheels of an automobile raised from the floor, as indicated by dotted lines. Fig. 3 is a central longitudinal section on the plane of line III—III of Fig. 1, showing the front axle of the automobile contacting the bumper preparatory to raising the jack. Fig. 4 is a vertical cross section on line IV—IV of Fig. 2, of the forward portion of the jack. Fig. 5 is a vertical cross section on line V—V of Fig. 2. Fig. 6 is a section, enlarged, on line VI—VI of Fig. 1.

In carrying out the invention, I employ a rectangular stationary frame 1, made, preferably of longitudinal gas-pipes 2, elbows 3, and front and rear struts 4 and 5, respectively. The rear ends of the longitudinal pipes 2 are screwed into housing 6, spaced apart by the rear strut 5, the ends of which are threaded into sockets 6$^a$ projecting laterally from the adjacent sides of said housings 6.

7 designates a pair of bell-crank levers mounted within the housings 6. Each bell-crank lever 7 has fulcrum points 8 and 9 adapted to rockably engage sockets 10 and 11 in the bottom of its respective housing 6, for the purpose of increasing the lift of the bell-crank lever when it rocks from the dotted to the full line position disclosed by Fig. 6, for a purpose which will hereinafter appear. The bell-crank levers are supported laterally by cheeks 33 constituting the sides of the housings 6. The upper ends of the bell-crank levers 7 are pivotally-connected to links 12, provided at their forward ends with internally threaded sockets 13 into which are screwed the sides of a movable frame 14.

The movable frame 14, in the present instance, consists of the bell-crank levers 7, the links 13, two longitudinal gas pipes 15, a transverse gas pipe 16, elbows 17 connecting the forward ends of the gas pipes 15 to the gas pipe 16, oscillatory arms 18, T-couplings 19 screwed upon the upper ends of the oscillatory arms 18 and swiveled upon the gas pipe 16, and a pair of T-couplings 20 swiveled upon the front strut 4 of frame 1 and having threaded connections with the lower ends of the arms 18. The rear end of the frame 14 is left open for the passage of the gear case D, on the rear axle C of an automobile, when the same is driven over the jack. The forward transverse pipe 16 of the movable frame 14, is reinforced with a sleeve 21 swiveled thereon and constituting part of a bumper 22 arranged in the path of the front axle A of the automobile. In addition to the sleeve 21, bumper 22 has a sleeve 23 arranged below and extending at right angles to sleeve 21 to receive a supporting member 24, whereby the movable frame 14 is prevented from collapsing.

The supporting member 24, is preferably, in the form of a gas pipe threaded at its rear end into a socket 25, integral with a sleeve 26, swiveled on the rear strut 5 to reinforce the same. The forward end of the supporting member 24 extends forwardly and slidably through the sleeve 23 of the bumper 22, and is provided with a keeper 27 to coact with a latch 28 pivotally-connected at its rear end to said sleeve 23. The keeper 27 is notched at 27' to receive the latch 28 and prevent it from swinging laterally out of engagement with said keeper. The buffer 29, preferably in the form of a coil spring, is interposed between the sleeve 23 and the keeper 27 to avoid shock when the bumper 22 is forced forwardly from the impact of the front axle A, and also to restore the movable frame 14 to its normal or lower position, Fig. 3, when relieved of the weight of the vehicle. An adjustable stop in the form of a collar 30 with a set-screw 31 is secured to the supporting member 24 in the path of the sleeve 23, to limit the downward movement of the movable frame 14. The collar 30 may be adjusted forward or backward to increase or diminish the downward movement of the frame 14, to accommodate axles of different heights.

In practice, when the vehicle is in lowered position, as disclosed by Fig. 3, it may be actuated to lift an automobile until its tires B are raised from the floor of the garage, as disclosed by Fig. 2, by driving the automobile just fast enough to have its forward axle A impinge against the bumper 22 and force the same upward and forward until the shoulder 28$^a$ of the latch 28 engages the front side of the keeper 27. Before this occurs, however, the tires B are lifted from the floor, so that the forward and upward motion of the frame 14 is completed by the momentum acquired while the tires are running on the floor. As the frame 14 moves forward its rear end is raised higher than its front end by the bell-crank levers 7 rocking forwardly from their fulcrum points 8 upon their fulcrum points 9. The higher raise at the rear end is necessary as the rear axle C is higher than the front axle A, at the points engaged by the frame 14. To lower the frame 14 and the automobile, it is only necessary to lift the latch 28 out of engagement with the keeper 27, when the weight of the automobile and the expansion of the spring 29 will force the frame 14 backward and downward until the sleeve 23 contacts the collar 30 and the fulcrum points 9 of the bell-crank levers 7 contact the stops 32 in the upper forward portions of the housing 6.

Having thus described my invention, what I claim and desire to secure by Letters Patent, is:

1. A jack of the class described comprising a stationary frame having housings at its rear ends, said housings having sockets formed therein, bell cranks loosely pivoted in the housings and having fulcrum points for alternately engaging said sockets, oscillatory arms carried by the forward end of said frame, a transverse pipe supported by said arms, a sleeve loosely engaging said pipe, a movable frame having its forward end connected to the pipe and its rear end to the bell cranks, and means carried by the sleeve for rocking the movable frame and shifting the fulcrum points of the bell cranks in the sockets of the housings when the front axle of a vehicle engages said means.

2. A jack of the class described comprising a stationary frame having housings at its rear ends, said housings have sockets formed therein, bell cranks loosely pivoted in the housings and having fulcrum points for alternately engaging said sockets, oscillatory arms carried by the forward end of said frame, a transverse pipe supported by said arms, a sleeve loosely engaging said pipe, a movable frame having its forward end connected to the pipe and its rear end to the bell cranks, a bumper carried by the sleeve, and having a sleeve thereon, a supporting bar having its forward end slidably and yieldably engaged in the second named sleeve, the rear end of said supporting bar being pivotally connected to the rear end of the stationary frame, a keeper carried by the forward end of the supporting bar, a pivoted latch adapted to engage said keeper, for holding the movable frame elevated after the front axle of a vehicle has engaged the bumper.

In testimony whereof I affix my signature, in the presence of two witnesses.

STUART D. SMITH.

Witnesses:
F. G. FISCHER,
L. J. FISCHER.

Copies of this patent may be obtained for five cents each, by addressing the "Commissioner of Patents, Washington, D. C."